United States Patent
Sun

(10) Patent No.: US 10,203,408 B2
(45) Date of Patent: Feb. 12, 2019

(54) METHOD AND APPARATUS FOR DETECTION AND RANGING FAULT DETECTION AND RECOVERY

(71) Applicant: Faraday & Future Inc., Gardena, CA (US)

(72) Inventor: Xinghui Sun, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/662,650

(22) Filed: Jul. 28, 2017

(65) Prior Publication Data

US 2018/0196133 A1 Jul. 12, 2018

Related U.S. Application Data

(60) Provisional application No. 62/368,714, filed on Jul. 29, 2016.

(51) Int. Cl.

| | | |
|---|---|---|
| *G01S 13/86* | (2006.01) | |
| *G06K 9/00* | (2006.01) | |
| *B60K 31/00* | (2006.01) | |
| *G01S 13/93* | (2006.01) | |
| *G01S 7/40* | (2006.01) | |
| *G01S 17/02* | (2006.01) | |
| *G01S 15/93* | (2006.01) | |
| *G01S 15/02* | (2006.01) | |
| *G01S 17/93* | (2006.01) | |

(52) U.S. Cl.

CPC ........ *G01S 13/867* (2013.01); *B60K 31/0008* (2013.01); *G01S 7/40* (2013.01); *G01S 13/931* (2013.01); *G01S 15/025* (2013.01); *G01S 15/931* (2013.01); *G01S 17/023* (2013.01); *G06K 9/00805* (2013.01); *G01S 17/936* (2013.01); *G01S 2013/936* (2013.01); *G01S 2013/9364* (2013.01); *G01S 2013/9367* (2013.01)

(58) Field of Classification Search

CPC .......... G08G 1/16; G08G 1/161; G08G 1/166; G08G 1/167; G08G 1/0967; B60W 2550/14; G01S 13/931; G06T 2207/30252; G06T 2207/30256

USPC .................. 340/435, 903, 905; 348/148, 149

See application file for complete search history.

(56) References Cited

U.S. PATENT DOCUMENTS

| | | | | |
|---|---|---|---|---|
| 4,790,402 A | * | 12/1988 | Field ...................... | G01S 17/936 180/169 |
| 4,846,297 A | * | 7/1989 | Field ...................... | G01S 17/936 180/169 |
| 6,414,628 B1 | * | 7/2002 | Ashihara ................... | G01S 7/40 342/104 |
| 9,719,801 B1 | * | 8/2017 | Ferguson ............... | G01C 25/00 |

(Continued)

*Primary Examiner* — Curtis King

(74) *Attorney, Agent, or Firm* — Veros Legal Solutions, LLP

(57) ABSTRACT

A system for vehicular detection and ranging fault detection, notification, and recovery is provided. The system may include at least one detection and ranging device, at least one camera, and at least one physical processing unit configured with program instructions. The processing unit may be configured to analyze detection and ranging data of an object from the detection and ranging device, analyze image data received of the object from the at least one camera and, based on a comparison, detect a detection and ranging fault.

20 Claims, 5 Drawing Sheets

(56) References Cited

U.S. PATENT DOCUMENTS

| | | | | |
|---|---|---|---|---|
| 9,946,906 | B2* | 4/2018 | Ricci | B60L 11/1822 |
| 2013/0041576 | A1* | 2/2013 | Switkes | G08G 1/166 |
| | | | | 701/123 |
| 2013/0328701 | A1* | 12/2013 | Sato | G01S 3/808 |
| | | | | 340/943 |
| 2014/0063251 | A1* | 3/2014 | Kim | G08G 1/167 |
| | | | | 348/148 |
| 2014/0218508 | A1* | 8/2014 | Kim | B62D 15/025 |
| | | | | 348/118 |
| 2015/0066412 | A1* | 3/2015 | Nordbruch | G07C 5/008 |
| | | | | 702/104 |
| 2015/0165975 | A1* | 6/2015 | Meadows | B60R 1/006 |
| | | | | 701/49 |
| 2016/0300113 | A1* | 10/2016 | Molin | G06T 7/80 |
| 2016/0301923 | A1* | 10/2016 | Ichige | H04N 13/239 |
| 2017/0109590 | A1* | 4/2017 | Gehrke | G06K 9/00791 |
| 2017/0169627 | A1* | 6/2017 | Kim | G07C 5/0808 |
| 2017/0261974 | A1* | 9/2017 | Ebe | G05D 1/0005 |

* cited by examiner

METHOD AND APPARATUS FOR DETECTION AND RANGING FAULT DETECTION AND RECOVERY

CROSS-REFERENCE TO RELATED APPLICATIONS

This application claims the benefit of U.S. Provisional Application No. 62/368,714, filed Jul. 29, 2016, the entirety of which is hereby incorporated by reference.

TECHNICAL FIELD

The present disclosure relates generally to methods and systems for detection and ranging fault detection, notification, and recovery.

BACKGROUND

Many modern vehicles rely on multiple sensors, including detection and ranging devices such as Radar and Lidar to assist with various functions, including navigation, collision avoidance, and steering assistant. Electronic detection and ranging faults, such as power failure or failure to send any data, may be easy to detect electronically. Other types of detection and ranging faults, such as calibration errors, may be difficult to detect electronically because the electronic function of the detection and ranging remains unaffected. Methods and systems presented herein may address certain detection and ranging faults.

SUMMARY

In an embodiment, a system for detection and ranging fault detection for a vehicle is provided. The system may include a vehicle detection and ranging device, a vehicle camera, one or more physical processors programmed by computer program instructions, and a notification unit configured to receive the detection and ranging fault notification signal and alert a user of the detection and ranging fault. When executed, the computer program instructions may cause the one or more physical processors to receive detection and ranging data of an object from the vehicle detection and ranging device, receive image data of the object from the vehicle camera, analyze the detection and ranging data received from the vehicle detection and ranging device, analyze the image data received from the vehicle camera, determine a detection and ranging device fault based on a comparison between the image data and the detection and ranging data, and transmit a detection and ranging fault notification signal based on the determined detection and ranging fault.

In an embodiment, a computer implemented method for detection and ranging fault detection for a vehicle is provided. The method may be implemented on a computer system having one or more physical processors programmed with computer program instructions to perform the method. The method may comprise receiving, via the computer system, detection and ranging data of an object from the vehicle detection and ranging device, receiving, via the computer system, image data of the object from a vehicle camera, analyzing, via the computer system, the detection and ranging data received from the vehicle detection and ranging device, analyzing, via the computer system, the image data received from the vehicle camera, determining, via the computer system, a detection and ranging device fault based on a comparison between the image data and the detection and ranging data, transmitting, via the computer system, a detection and ranging fault notification signal based on the determined detection and ranging fault, and providing the notification signal to a vehicle user.

In another embodiment, a computer implemented method for detection and ranging fault detection for a vehicle is provided. The method may be implemented on a computer system having one or more physical processors programmed with computer program instructions to perform the method. The method may comprise receiving, via the computer system, detection and ranging data of an object from a vehicle detection and ranging device, receiving, via the computer system, image data of the object from a vehicle camera, analyzing, via the computer system, the detection and ranging data received from the vehicle detection and ranging device, to determine a detection-and-ranging-computed distance between the vehicle and the object, analyzing, via the computer system, the image data received from the vehicle camera, to determine an image-computed distance between the vehicle and the object, comparing, via the computer system, the detection-and-ranging-computed distance with the image-computed distance, and determining, via the computer system, a detection and ranging device fault if the difference between detection-and-ranging-computed distance and the image-computed distance is above a threshold.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Systems, methods, and apparatuses consistent with the present disclosure may be suitable for vehicle detection and ranging fault detection, notification, and recovery. Vehicle detection and ranging devices may serve several functions, including navigation, collision avoidance, and steering assist. Detection and ranging faults or malfunctions may occur that reduce the effectiveness of the detection and ranging device at carrying out designated functions, while not incapacitating the detection and ranging device entirely. In such situations, the faulty detection and ranging device may continue to send detection and ranging data to vehicle computers. Embodiments consistent with the present disclosure provide systems and methods of detecting detection and ranging fault based on detection and ranging data collected by the detection and ranging device, notifying a user or vehicle system of the fault, and taking action to recover from and/or compensate for the detection and ranging device fault.

As used herein, detection and ranging devices refer to devices and/or technologies used for remote sensing of distance, speed, size, and other parameters. Examples of detection and ranging devices include RADAR (radio detection and ranging), LIDAR and ranging (light detection and ranging), and SONAR (sound navigation and ranging).

Figure 1:
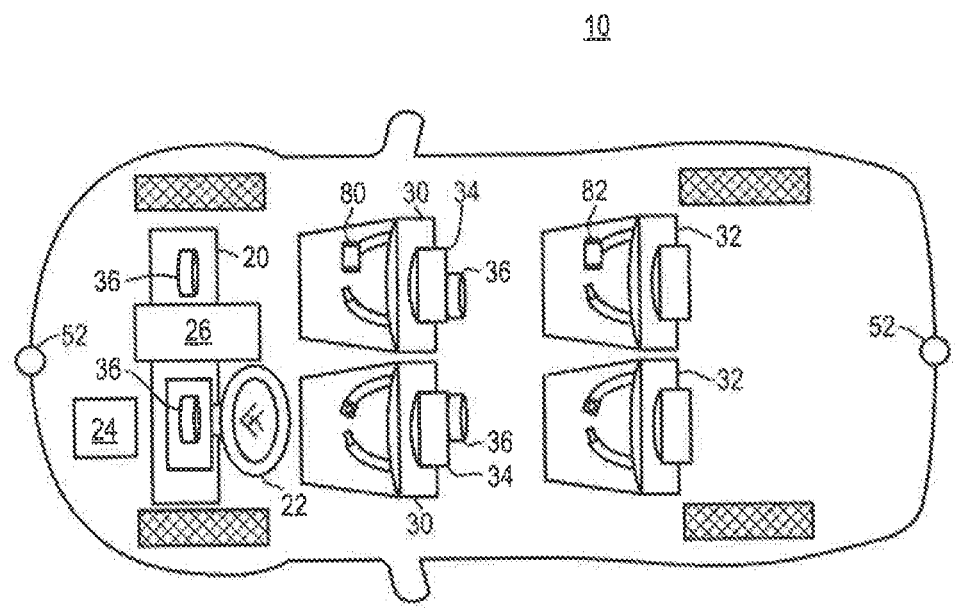
FIG. 1 is a graphical representation illustrating a vehicle consistent with embodiments described herein.

FIG. 1 is a graphical representation illustrating a vehicle 10 for detection and ranging fault detection, notification, and recovery, consistent with exemplary embodiments of the present disclosure. Vehicle 10 may have any body style of an automobile, such as a sports car, a coupe, a sedan, a pick-up truck, a station wagon, a sports utility vehicle (SUV), a minivan, or a conversion van. Vehicle 10 may also embody other types of transportation, such as motorcycles, boats, buses, trains, and planes. Vehicle 10 may be an electric vehicle, a fuel cell vehicle, a hybrid vehicle, or a conventional internal combustion engine vehicle. Vehicle 10 may be configured to be operated by a driver occupying vehicle 10, remotely controlled, and/or autonomous.

As illustrated in FIG. 1, vehicle 10 may include a number of components, some of which may be optional. Vehicle 10 may have a dashboard 20 through which a steering wheel 22 and a user interface 26 may project. In one example of an autonomous vehicle, vehicle 10 may not include steering wheel 22. Vehicle 10 may also have one or more front seats 30 and one or more back seats 32 configured to accommodate occupants. Vehicle 10 may further include one or more sensors 36 configured to detect and/or recognize occupants. Vehicle 10 may further include one or more detection and ranging devices 52. The positions of the various components of vehicle 10 in FIG. 1 are merely illustrative. For example, sensor 36 may include an infrared sensor disposed on a door next to an occupant, and/or a weight sensor embedded in a seat. Vehicle 10 may also include detector and GPS unit 24 disposed at various locations, such as the front of the vehicle. The detector may include an onboard camera.

In some embodiments, user interface 26 may be configured to receive inputs from users or devices and transmit data. For example, user interface 26 may have a display including an LCD, an LED, a plasma display, or any other type of display, and provide a graphical user interface (GUI) presented on the display for user input and data display. User interface 26 may further include speakers or other voice playing devices. User interface 26 may further include input devices, such as a touchscreen, a keyboard, a mouse, and/or a tracker ball. User interface 26 may further include a housing having grooves containing the input devices. User interface 26 may be configured to provide internet access, cell phone access, and/or in-vehicle network access, such as Bluetooth™, CAN bus, or any other vehicle bus architecture protocol that may be used to access features or settings within vehicle 10. User interface 26 may be further configured to display or broadcast other media, such as maps and lane-specific route navigations.

User interface 26 may also be configured to receive user-defined settings. For example, user interface 26 may be configured to receive occupant profiles including, for example, an age, a gender, a driving license status, an advanced driver assistance systems (ADAS) license status, an individual driving habit, a frequent destination, a store reward program membership, etc. In some embodiments, user interface 26 may include a touch-sensitive surface configured to receive biometric data (e.g., detect a fingerprint of an occupant). The touch-sensitive surface may be configured to detect the ridges and furrows of a fingerprint based on a change in capacitance and generate a signal based on the detected fingerprint, which may be processed by an onboard computer described below with reference to FIG. 2. The onboard computer may be configured to compare the signal with stored data to determine whether the fingerprint matches recognized occupants. The onboard computer may also be able to connect to the Internet, obtain data from the Internet, and compare the signal with obtained data to identify the occupants. User interface 26 may be configured to include biometric data into a signal, such that the onboard computer may be configured to identify the person who is generating an input. Furthermore, user interface 26 may be configured to store data history accessed by the identified people.

Sensor 36 may include any device configured to generate a signal to be processed to detect and/or recognize occupants of vehicle 10, for example, camera, microphone sound detection sensor, infrared sensor, weight sensor, radar, ultrasonic, LIDAR, or wireless sensor for obtaining identification from occupants' cell phones. In one example, a camera 36 may be positioned on the back of a headrest 34 of a front seat 30 to capture images of an occupant in a back seat 32. In some embodiments, visually captured videos or images of the interior of vehicle 10 by camera 36 may be used in conjunction with an image recognition software, such that the software may distinguish a person from inanimate objects, and may recognize the person based on physical appearances or traits. The image recognition software may include a facial recognition software configured to match a captured occupant with stored profiles to identify the occupant. In some embodiments, more than one sensor may be used in conjunction to detect and/or recognize the occupant(s). For example, sensor 36 may include a camera and a microphone, and captured images and voices may both work as filters to identify the occupant(s) from the stored profiles.

In some embodiments, sensor 36 may include electrophysiological sensors for encephalography-based autonomous driving. For example, fixed sensor 36 may detect electrical activities of brains of the occupant(s) and convert the electrical activities to signals, such that the onboard computer can control the vehicle based on the signals. Sensor 36 may also be detachable and head-mountable, and may detect the electrical activities when worn by the occupant(s).

Detector and GPS 24 may determine in real time the location of vehicle 10 and/or information of the surrounding environment, such as street signs, lane patterns, road marks, road conditions, environment conditions, weather conditions, and traffic conditions, and send the information for processing as described below with reference to FIG. 2.

Vehicle 10 may be in communication with a plurality of mobile communication devices 80, 82. Mobile communication devices 80, 82 may include a number of different structures. For example, mobile communication devices 80, 82 may include a smart phone, a tablet, a personal computer, a wearable device, such as a smart watch or Google Glass™, and/or complimentary components. Mobile communication devices 80, 82 may be configured to connect to a network, such as a nationwide cellular network, a local wireless network (e.g., Bluetooth™ or WiFi), and/or a wired network. Mobile communication devices 80, 82 may also be configured to access apps and websites of third parties, such as iTunes™, Pandora™, Google™, Facebook™, and Yelp™.

In some embodiments, mobile communication devices 80, 82 may be carried by or associated with one or more occupants in vehicle 10. For example, vehicle 10 may be configured to determine the presence of specific people based on a digital signature or other identification information from mobile communication devices 80, 82. For instance, an onboard computer may be configured to relate the digital signature to stored profile data including the person's name and the person's relationship with vehicle 10. The digital signature of mobile communication devices 80, 82 may include a determinative emitted radio frequency (RF) signal or a global positioning system (GPS) tag. Mobile communication devices 80, 82 may be configured to automatically connect to or be detected by vehicle 10 through local network 70, e.g., Bluetooth™ or WiFi, when positioned within a proximity (e.g., within vehicle 10).

Vehicle 10 may be equipped with one or more detection and ranging devices 52, located inside or outside the vehicle. FIG. 1 illustrates some exemplary positions of detection and ranging device 52, which may also be disposed at other positions not shown in this figure. Detection and ranging device 52 may capture detection and ranging data, such as distances, speeds, and/or sizes of remote or nearby objects, that may be useful for various vehicle functions, including, but not limited to, steering assist, navigation, cruise control assist, and parking assist.

Figure 2:
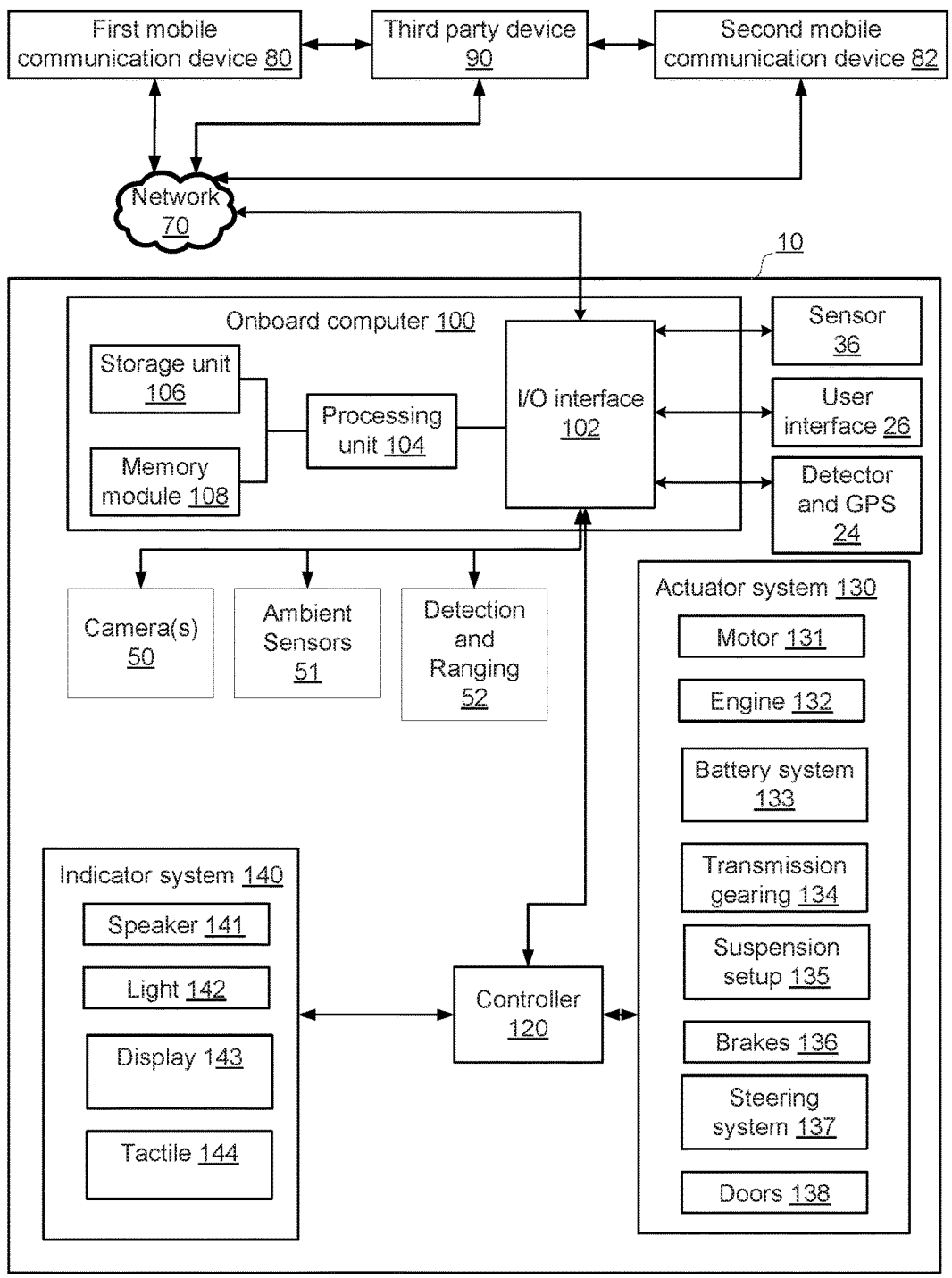
FIG. 2 is a schematic of an exemplary control system layout of a vehicle consistent with embodiments of the present disclosure.

FIG. 2 is a block diagram illustrating a system 11 for detection and ranging fault detection, notification, and recovery, consistent with exemplary embodiments of the present disclosure. System 11 may include a number of components, some of which may be optional. As illustrated in FIG. 2, system 11 may include vehicle 10, as well as other external devices connected to vehicle 10 through network 70. The external devices may include mobile terminal devices 80, 82, and third party device 90. Vehicle 10 may include a specialized onboard computer 100, a controller 120, an actuator system 130, an indicator system 140, a sensor 36, a user interface 26, a detector and GPS unit 24, one or more vehicle cameras 50, one or more ambient sensors 51, and one or more detection and ranging devices 52 (e.g., Radar and/or Lidar devices). Onboard computer 100, actuator system 130, and indicator system 140 may all connect to controller 120. Sensor 36, user interface 26, detector and GPS unit 24, vehicle cameras 50, ambient sensors 51, and detection and ranging devices 52 may all connect to onboard computer 100. Onboard computer 100 may comprise, among other things, an I/O interface 102, a physical processing unit 104, a storage unit 106, and a memory module 108. The above units of system 11 may be configured to transfer data and send or receive instructions between or among each other. Storage unit 106 and memory module 108 may be non-transitory and computer-readable and store instructions that, when executed by physical processing unit 104, cause vehicle 10 to perform the methods described in this disclosure. The onboard computer 100 may be specialized to perform the methods and steps described below.

I/O interface 102 may also be configured for two-way communication between onboard computer 100 and various components of system 11, such as user interface 26, detector and GPS 24, sensor 36, vehicle cameras 50, ambient sensors 51, and detection and ranging devices 52, as well as the external devices. I/O interface 102 may send and receive operating signals to and from mobile communication devices 80, 82 and third party devices 90. I/O interface 102 may send and receive the data between each of the devices via communication cables, wireless networks, or other communication mediums. For example, mobile communication devices 80, 82 and third party devices 90 may be configured to send and receive signals to I/O interface 102 via a network 70. Network 70 may be any type of wired or wireless network that may facilitate transmitting and receiving data. For example, network 70 may be a nationwide cellular network, a local wireless network (e.g., Bluetooth™ or WiFi), and/or a wired network.

Third party devices 90 may include smart phones, personal computers, laptops, and/or servers of third parties (e.g., Google Maps.™) that provide access to contents and/or stored data (e.g., maps, traffic, store locations, and weather). Third party devices 90 may be accessible to the users through mobile communication devices 80, 82 or directly accessible by onboard computer 100, via I/O interface 102, according to respective authorizations of the user. For example, users may allow onboard computer 100 to receive contents from third party devices by configuring settings of accounts with third party devices 90 or settings of mobile communication devices 80, 82.

Processing unit 104 may be configured to receive signals and process the signals to determine a plurality of conditions of the operation of vehicle 10, for example, through controller 120. Processing unit 104 may also be configured to generate and transmit command signals, via I/O interface 102, in order to actuate the devices in communication.

In some embodiments, processing unit 104 may be configured to receive and analyze detection and ranging data from detection and ranging device(s) 52. Detection and ranging data received from detection and ranging device 52 may include sensing information about speed, distance, and size of distant or nearby objects. Detection and ranging data may be captured continuously and may also be captured in discrete bursts.

The detection and ranging data may be analyzed and compared, by processing unit 104, with camera image data to detect, locate, and/or discover anomalies and/or inconsistencies in the detection and ranging data. The camera image data may be captured by the one or more cameras 50. The detected anomalies in detection and ranging data may include, for example, inaccuracies in reported distances and/or sizes.

Processing unit 104 may be configured to detect a detection and ranging fault based on a comparison between detection and ranging data and camera image data. During detection and ranging data analysis, processing unit 104 may detect an anomaly within the detection and ranging data. Camera image data may be processed to determine approximate sizes and distances of remote or nearby objects. The results from the camera image data may be compared to the detection and ranging data to determine whether the detection and ranging devices are operating properly.

A detected anomaly may be graded by a severity of the anomaly. The severity of the anomaly may be based on a likelihood of the anomaly to cause vehicle systems to function poorly. If the comparison between the detection and ranging data and the camera image data reveals that a detection and ranging device is miscalibrated or otherwise providing erroneous information, the degree to which the information is in error may be important. For example, if the detection and ranging data is in error by less than 5%, the appropriate course of action may be to continue to monitor the affected detection and ranging device, rather than attempting fault recovery, as described further below. In another example, if the detection and ranging data is more significantly in error, the appropriate course of action may be to initiate recovery measures immediately and/or warn a user to stop operating the vehicle until recovery measures are complete.

In some embodiments, processing unit 104 may also be configured to transmit a malfunction notification signal based on the determined detection and ranging device 52 malfunction. After a malfunction or fault has been determined, processing unit 104 may cause a notification signal to be transmitted. Such a signal may be transmitted to a user notification device—e.g., a vehicle Heads Up Display (HUD), main display, LED, dashboard, user smartphone, etc., and/or to vehicle controller 120. The notification signal may include information that a detection and ranging fault has occurred, which detection and ranging device the fault has occurred in, and the severity of the fault.

In some embodiments, processing unit 104 may be configured to activate a detection and ranging fault recovery protocol. A detection and ranging fault recovery protocol may include, for example, resetting a detection and ranging subsystem, augmenting detection and ranging data with image data, augmenting detection and ranging data with network data, calibrating a detection and ranging subsystem, and/or notifying a user that further action is required. In some embodiments, a detection and ranging fault recovery protocol may include the use of supplemental data provided by a camera, a non-faulty detection and ranging device, and/or other sources of information available to vehicle 10. Such other sources may include GPS data and/or vehicle-to-vehicle data. For example, where a forward looking detection and ranging device has developed a fault during highway driving, the information it provides may no longer be suitable for an adaptive cruise control technique. However, if vehicle-to-vehicle information is available, processing unit 104 of a first vehicle may receive supplemental information from a second vehicle ahead of the first vehicle. Such supplemental information, which may include data about the second vehicle's speed and braking, may assist processing unit 104 in implementing adaptive cruise control in the first vehicle.

Storage unit 106 and/or memory module 108 may be configured to store one or more computer programs that may be executed by onboard computer 100 to perform functions of system 11. For example, storage unit 106 and/or memory module 108 may be configured to process instructions to carry out the detection and ranging analysis, and fault detection methods described herein. Storage unit 106 and/or memory module 108 may further be configured to store data useful for carrying out detection and ranging analysis and fault detection methods described herein. For example, memory module 108 may include a database including information about license plate sizes, tire heights, car heights, car lengths, car logos, car types, car models, and associations between any of these.

Vehicle 10 may also include a controller 120 connected to the onboard computer 100 and capable of controlling one or more aspects of vehicle operation, such as performing autonomous parking or driving operations using instructions from the onboard computer 100, and/or operating detection and ranging units.

In some examples, the controller 120 is connected to one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137, and door system 138. Steering system 137 may include steering wheel 22 described above with reference to FIG. 1. The onboard computer 100 can control, via controller 120, one or more of these actuator systems 130 during vehicle operation; for example, to open or close one or more of the doors of the vehicle using the door actuator system 138, to control the vehicle during autonomous driving or parking operations, using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle or part of user interface 26), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). Onboard computer 100 can control, via controller 120, one or more of these indicator systems 140 to provide indications to a driver of the vehicle of one or more characteristics of the vehicle's surroundings. The characteristics may be determined by sensor 36.

Figure 3:
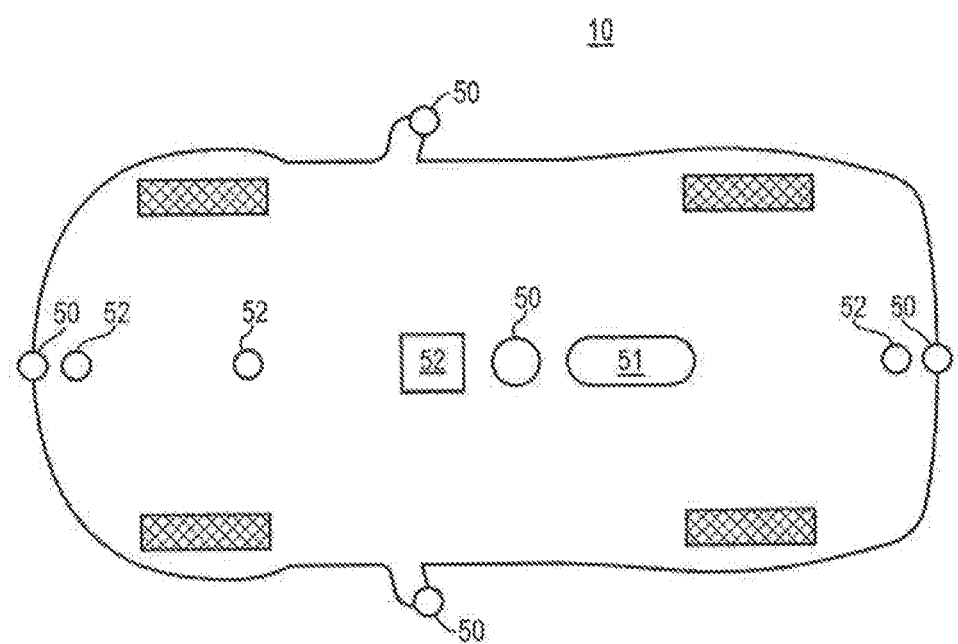
FIG. 3 is a vehicle schematic illustrating exemplary detection and ranging device locations consistent with embodiments of the present disclosure.

FIG. 3 illustrates an exemplary vehicle schematic with detection and ranging device locations illustrated. As illustrated in FIG. 3, vehicle 10 may include one or more detection and ranging devices 52. FIG. 3 illustrates detection and ranging devices 52 located at front, rear, and atop vehicle 10. The illustrated detection and ranging device locations are exemplary only. Methods and systems consistent with the disclosure may be operated in conjunction with any number of detection and ranging devices 52 located in any location on the exterior of vehicle 10 or in the interior of vehicle 10. For example, in some embodiments ranging devices 52 may include a Lidar device positioned slightly above the front hood of vehicle 10, and/or substantially in the center of the hood, as shown in FIG. 3. In addition to detection and ranging devices 52, vehicle 10 may further include at least one ambient light sensor 51, and one or more cameras 50.

Figure 4:
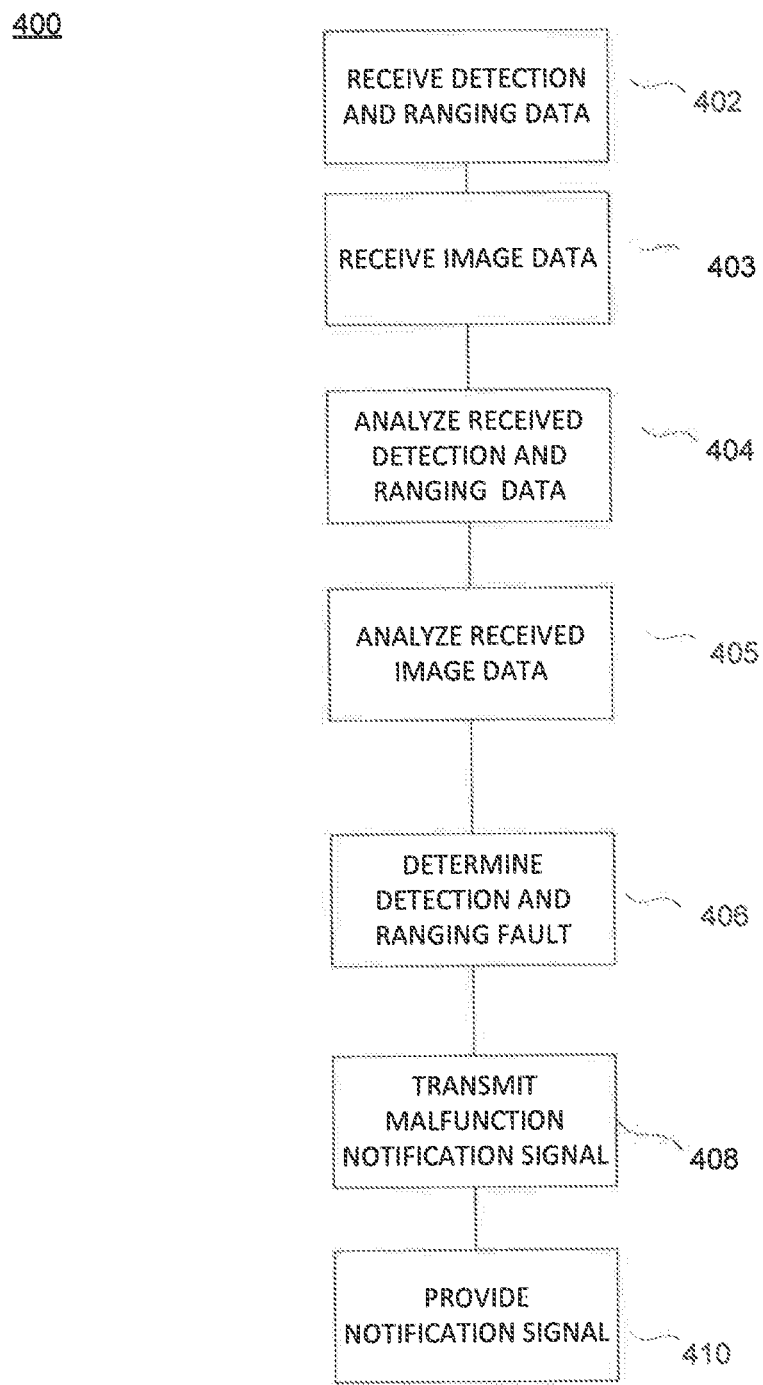
FIG. 4 is a flow chart depicting steps of an exemplary detection and ranging fault detection and notification method according to an implementation of the present disclosure.

FIG. 4 is a flow chart depicting steps of an exemplary detection and ranging device fault detection and notification method 400. A detection and ranging device fault detection and notification method may be at least partially carried out by a processing unit 104 of onboard computer 100, which may interface with various aspects of vehicle 10 via I/O interface 102. As described with respect to FIG. 4, steps of a detection and ranging device fault detection and notification method may be carried out by a processing unit 104 of onboard computer 100. In some implementations, some or all of the steps of detection and ranging device fault detection and notification method 400 may be carried out by one or more processing units associated with and/or co-located with any of the detection and ranging devices 52. In some implementations, some or all of the steps of detection and ranging fault detection and notification method 400 may be carried out by one or more processing units associated with and/or co-located with respective detection and ranging devices 52 for which a fault is monitored/detected. In some implementations, some or all of the steps of detection and ranging device fault detection and notification method 400 may be carried out by processing units associated with a cloud computing network.

In an operation 402, onboard computer 100 may receive detection and ranging data from one or more detection and ranging devices 52. As discussed above, such detection and ranging devices 52 may be located anywhere on the exterior or interior of vehicle. Detection and ranging data received from detection and ranging devices 52 may include distance, speed, size, and other measurements. Detection and ranging data may be captured continuously and/or discretely.

In an operation 403, onboard computer 100 may receive image data from one or more vehicle cameras 50. Operation 402 and operation 403 may be implemented concurrently or in any other order. Cameras 50 may be located anywhere on the exterior or interior of vehicle, for example, front, back, two sides, and the top of the vehicle. Image data received from camera 50 may include images and/or video. Images may be captured continuously, at frame rates ranging from multiple frames per second to multiple seconds between frames, depending on the circumstances. Image data may also include video, captured at any suitable frame rate. Cameras 50 may capture images of neighboring vehicles, static objects on the street, like street signs (stop sign, yield sign, etc.), trees, buildings, etc.

In an operation 404, onboard computer 100 may analyze the detection and ranging data received. Detection and ranging data may be analyzed for comparison with image data to detect, locate, and/or discover anomalies and/or inconsistencies in the detection and ranging data.

In some implementations, analysis of the detection and ranging data may be similar to detection and ranging analysis carried out on an ongoing basis for other vehicle functions. Vehicle 10 may collect and analyze detection and ranging data for assisting vehicle functions such as collision avoidance, steering assist, adaptive cruise control, etc. In this role, onboard computer 100 may determine distances, speeds, and sizes of remote objects from collected detection and ranging data. Such data, in addition to its use in vehicle functions, may also be used in fault detection method 400.

In some implementations, detection and ranging data may be collected and analyzed primarily for use in fault detection method 400. Vehicle 10 may include diagnostic functions that are carried out on a regular and/or random basis to determine whether all detection and ranging devices are operating correctly. Such diagnostic functions may be carried out, for example, on vehicle start-up and/or at regular intervals during vehicle operation.

In an operation 405, onboard computer 100 may analyze image data received. Operation 405 may be performed before or concurrently with operation 404. Image data may be from one or more cameras 50, including front cameras, left and right cameras, rear cameras, and surround cameras, and may be analyzed for comparison with received detection and ranging data.

In some implementations, image data may be analyzed to determine a distance between vehicle 10 and neighboring objects, including vehicles, such as those in front, rear, front left, front right, rear left, and rear right. Distances to neighboring objects may be computed based on a comparison between captured image size and known object sizes. Known object sizes may include license plate sizes, vehicle lengths, widths, and heights, and tire sizes. That is, by comparing a size of a vehicle, portion of a vehicle, or other object in a captured image to a known size of the vehicle, portion of a vehicle, or other object, stored in a size database of memory module 108, a distance between vehicle 10 and a neighboring object may be determined. The determination may be further based on a relative position between the neighboring object and the detector, such as a viewing angle of the object from the detector. In some embodiments, the determination may be based on image data of objects of standard sizes, such as street signs (stop sign, yield sign, etc.). The onboard computer 100 may calculate the distance geometrically from the relative position and the image comparison. In some implementations, a size database may be stored locally on the onboard computer 100 or in a remote location, for example in a cloud storage database.

In some implementations, known object sizes may be estimated. Such estimations may be made based on a vehicle type determination made by onboard computer 100 based on captured image data. Onboard computer 100 may determine a body type of vehicle based on, for example, a silhouette of a vehicle. By comparing a determined body type, e.g., minivan, truck, SUV, to information stored in the size database of memory module 108, onboard computer 100 may estimate the size of the neighboring vehicle.

In some implementations, onboard computer 100 may estimate the size of the neighboring vehicle based on a standard estimate for all vehicles. A standard estimate for all vehicles may be based on an average size of cars and or trucks that are found on typical roads.

In some implementations, image data may be analyzed to determine the distance to a neighboring vehicle based on a comparison between a captured image of the vehicle length, width, or height, and a captured image of a road and/or lane width. Roads and/or lanes may frequently be constructed within a set range of widths. By comparing the width of a vehicle to the width of the road that it is on, an estimate of the vehicle width may be made. By comparing the estimated vehicle width to the captured image data, an estimate of distance may be made. Other dimensions or aspects of a vehicle may be estimated in a similar fashion—e.g., in comparison with another neighboring object of known size. Other neighboring objects may include, for example, road widths, sign sizes, road line lengths, and others.

In some implementations, image data may be analyzed to determine the distance to a neighboring vehicle by identifying a specific make, model, and year of the vehicle. By comparing captured images to images and information stored in a size database of memory module 108, onboard computer may identify a make, model, and year of a vehicle and thus have a more precise measurement of vehicle size. Onboard computer may identify a make, model, and year of another vehicle based on logo images, distinguishing vehicle portions, and other aspects of a captured image.

In some implementations, image data may be analyzed to determine a velocity (speed and direction) and/or a relative velocity (speed and direction with respect to vehicle 10) of a detected neighboring object based on image data. As discussed above, a distance to a neighboring object may be computed based on a comparison between a known object size and a captured image of the object. Where one or more of vehicle 10 and the neighboring object are moving, multiple successive images and/or video data may be used to determine a velocity and/or relative velocity of the neighboring object based on successively computed distances.

In some embodiments, vehicle cameras 50 may include one or more depth cameras or time-of-flight cameras. In an operation 405, onboard computer 100 may receive depth or distance related signals from vehicle cameras 50, and calculate the depth or distance to a detected object.

In an operation 406, onboard computer 100 may determine a detection and ranging fault based on a comparison between the analyzed detection and ranging data and the analyzed image data. As discussed above, analysis of image data may determine a distance and/or velocity of a detected object. These distances and/or velocities may be compared to distances and velocities computed by onboard computer 100 based on the detection and ranging data. Discrepancies between the image based computations and the detection and ranging based computations may indicate a fault of the detection and ranging device 52.

Fault determination may be based on a size of a discrepancy between image based computations and the detection and ranging based computations. Small discrepancies, e.g., less than 5%, less than 10%, less than 20%, and/or less than another suitable threshold, may not be significant enough to indicate fault of the detection and ranging device 52. If the discrepancy is above the threshold, the onboard computer 100 may determine a detection and ranging fault. Image based computations may be less accurate than the detection and ranging based computations (e.g., the image based computations are based on estimated vehicle sizes), and thus, small discrepancies may be tolerated. Alternatively, even with accurate image based computations, small discrepancies that do not significantly affect vehicle safety and performance may be tolerated.

In some implementations, degrees of fault may be determined based on a size of a discrepancy between image based computations and the detection and ranging based computations. Small, but significant discrepancies, may be determined as moderate faults. Greater discrepancies may be determined as severe faults. The degree of fault that is determined by onboard computer 100 may determine a system response during a notification and/or recovery operation.

In an operation 408, onboard computer 100 may transmit a malfunction notification signal based on the determined detection and ranging device 52 malfunction. The transmitted signal may be a signal indicating that there is a malfunction in the detection and ranging system, a signal indicating that there is a malfunction in a particular detection and ranging device 52, a signal indicating a particular type of malfunction in a particular detection and ranging device 52, and/or any other suitable signal indicating fault with the vehicle detection and ranging systems. The transmitted signal may be transmitted from onboard computer 100 via i/o interface 102 to various other vehicle systems, including, for example, a notification unit of user interface 26 and a controller 120. In implementations including detection of a degree of detection and ranging device fault, the transmitted notification signal may include information regarding the degree of detection and ranging device fault.

In an operation 410, a notification signal may be provided. In some implementations, the notification signal may be provided to a vehicle user via user interface 26. In some implementations, the notification signal may be provided to controller 120, from which it may be routed to any of the various vehicle 10 subsystems. The notification signal may be provided to a vehicle user via user interface 26 in the form of a sound, such as a beep or siren, a light, or any other type of notification. The notification signal may be provided to a user via LEDs located within vehicle 10, via a HUD, via a user smartphone, via a main display of vehicle 10, and/or any other suitable means.

The notification signal may be provided so as to alert the user to a degree of severity of the detection and ranging device 52 fault. For example, where a detection and ranging device 52 fault prevents optimal operation, a vehicle user may be warned that a particular detection and ranging device 52 should be attended to. In another example, a vehicle user may be warned with a more urgent notification if a detection and ranging device 52 fault decreases vehicle safety. In some implementations, controller 120 may prevent vehicle operation if a degree of severity of a detection and ranging device 52 fault surpasses a predetermined threshold.

Figure 5:
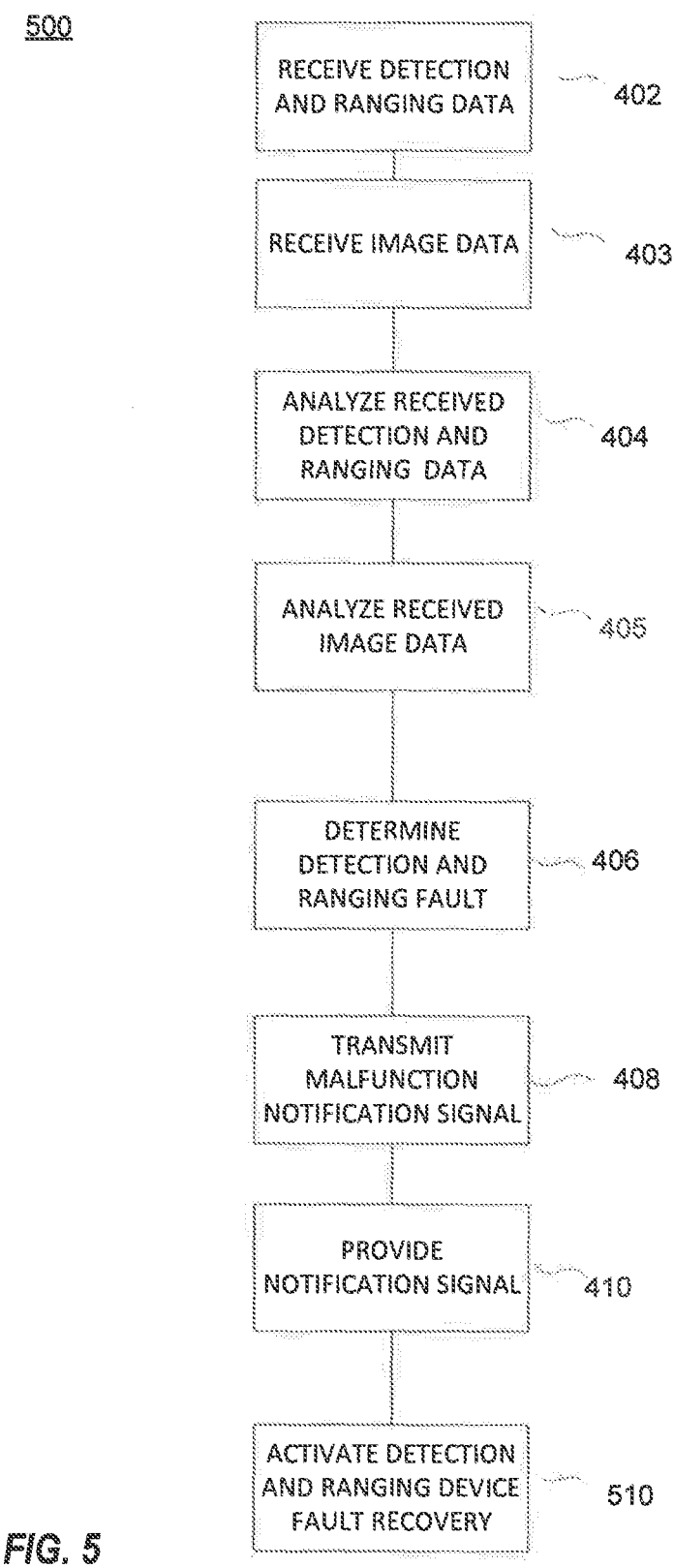
FIG. 5 is a flow chart depicting steps of an exemplary detection and ranging fault detection, notification, and recovery method according to an implementation of the present disclosure.

FIG. 5 is a flow chart depicting steps of an exemplary detection and ranging device fault detection and recovery method 500. Operations 402-410 may be carried out as described above with respect to detection and ranging device fault detection and notification method 400. In some implementations, some or all of the steps of detection and ranging device fault detection and recovery method 500 may be carried out by processor 104 of onboard computer 100. In some implementations, some or all of the steps of detection and ranging fault detection and recovery method 500 may be carried out by one or more processing units associated with and/or co-located with any of the detection and ranging device 52. In some implementations, some or all of the steps of detection and ranging fault detection and recovery method 500 may be carried out by one or more processing units associated with and/or co-located with a respective detection and ranging device 52 for which a fault is monitored/detected. In some implementations, some or all of the steps of detection and ranging device 52 fault detection and recovery method 500 may be carried out by processing units associated with a cloud computing network.

In an operation, after a fault notification signal has been provided to controller 120, controller 120 may activate a detection and ranging device fault recovery operation 510. Detection and ranging device fault recovery may include the activation of a recovery system relying on supplemental detection and ranging data, the resetting of detection and ranging subsystems, the operation of vehicle 10 in a compensatory safety mode, and/or immobilizing the vehicle. The choice of recovery may be based on a degree of detected detection and ranging fault.

In some implementations, detection and ranging fault recovery may include the activation of a supplemental data technique. A supplemental data technique may include the use of supplemental data from one or more sources.

In some implementations, supplemental data may be provided by vehicle cameras. In such implementations, distance and speed measurements may be determined from captured image data by any of the means discussed above with respect to detection and ranging fault detection.

In some implementations, supplemental data may be provided by a vehicle-to-vehicle communication system. That is, a second vehicle may provide detection and ranging to supplement the detection and ranging data from the fault detection and ranging device 52 to provide safe operation of vehicle 10. Detection and ranging data from a second vehicle may assist vehicle 10, for example, when travelling in traffic. If the second vehicle is directly in front of vehicle 10, the second vehicle may supply vehicle 10 with detection and ranging data about the distance between vehicle 10 and the second vehicle. Likewise, vehicles to the left, right, and behind vehicle 10 may supply similar information.

A second vehicle may also provide information about its own location, speed, surroundings, size, model, make, etc., to vehicle 10 having a fault detection and ranging device 52. Even without directly providing detection and ranging data, vehicle 10 may use information about speed and location of a second vehicle to supplement the missing and/or fault detection and ranging data. In some implementations, the second vehicle may provide information about its own size (i.e., by providing make/model information and/or direct measurements). Vehicle 10 may use the provided information to compute distances to the second vehicle based on image data, as described above.

In some implementations, a severe fault in a detection and ranging system may result in onboard computer 100 immobilizing vehicle 10 for safety purposes.

In some implementations, a fault in a detection and ranging system may result in onboard computer 100 operating vehicle 10 in a compensatory safety mode. In a compensatory safety mode, vehicle 10 may be operated with larger safety margins. Larger safety margins may be applied to vehicle-to-vehicle distances, vehicle-to-object distances, etc. For example, where a minor to moderate detection and ranging fault is determined (e.g., detection and ranging information is inaccurate by 30%), vehicle 10 may double standard vehicle to vehicle distances and stopping lengths to compensate for the inaccurate data.

In some implementations, vehicle 10 may reset detection and ranging subsystems to recover the fault detection and ranging device 52. During reset periods, vehicle 10 may rely on one of the other fault recovery methods discussed herein.

Another aspect of the disclosure is directed to a non-transitory computer-readable storage medium storing instructions which, when executed, cause one or more processors to perform methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage unit or the memory module having the computer instructions stored thereon, as disclosed. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for detection and ranging device fault detection, notification, and recovery. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A system for a vehicle, the system comprising:
   a vehicle detection and ranging device;
   a vehicle camera; and
   one or more physical processors programmed by computer program instructions that, when executed, cause the one or more physical processors to:
   receive detection and ranging data of an object from the vehicle detection and ranging device;
   receive image data of the object from the vehicle camera;
   analyze the detection and ranging data received from the vehicle detection and ranging device;
   analyze the image data received from the vehicle camera; and
   determine a detection and ranging device fault based on a comparison between the analyzed image data and the analyzed detection and ranging data.

2. The system of claim 1, further comprising a notification unit configured to receive the detection and ranging fault notification signal and alert a user of the detection and ranging fault.

3. The system of claim 1, wherein to analyze the detection and ranging data, the one or more physical processors are further caused to determine a detection-and-ranging-computed distance between the vehicle and the object; and
   wherein to analyze the image data, the one or more physical processors are further caused to determine an image-computed distance between the vehicle and the object.

4. The system of claim 3, wherein to determine a detection and ranging device fault based on a comparison between analyzing results of the image data and the detection and ranging data, the one or more physical processors are further caused to compare the image-computed distance and the detection-and-ranging-computed distance.

5. The system of claim 3, wherein to determine a detection and ranging device fault based on a comparison between analyzing results of the image data and the detection and ranging data, the one or more physical processors are further configured to compare a known size of the object with a detection-and-ranging-captured size of the object.

6. The system of claim 5, wherein the one or more physical processors are further caused to query a size database to determine the known size of the object.

7. The system of claim 6, wherein the one or more physical processors are further configured to query the size database to determine the known size of at least one of: a vehicle length, a vehicle width, a vehicle height, or a license plate.

8. The system of claim 1, wherein the vehicle detection and ranging device comprises a Lidar device.

9. The system of claim 1, wherein the vehicle detection and ranging device comprises a Radar device.

10. The system of claim 1, wherein the one or more physical processors are further configured to augment detection and ranging data received from the fault detection and ranging device with image data from the vehicle camera.

11. A computer implemented method for a vehicle, the method being implemented on a computer system having one or more physical processors programmed with computer program instructions to perform the method, the method comprising:

receiving, via the computer system, detection and ranging data of an object from a vehicle detection and ranging device;

receiving, via the computer system, image data of the object from a vehicle camera;

analyzing, via the computer system, the detection and ranging data received from the vehicle detection and ranging device;

analyzing, via the computer system, the image data received from the vehicle camera; and determining, via the computer system, a detection and ranging device fault based on a comparison between the analyzed image data and the analyzed detection and ranging data.

12. The method of claim 11, wherein analyzing the detection and ranging data further comprises determining a detection-and-ranging-computed distance between the vehicle and the object; and wherein analyzing the image data further comprises determining an image-computed distance between the vehicle and the object.

13. The method of claim 12, wherein determining, via the computer system, a detection and ranging device fault based on a comparison between analyzing results of the image data and the detection and ranging data comprises comparing, by the computer system, the image-computed distance and the detection-and-ranging-computed distance.

14. The method of claim 12, wherein determining, via the computer system, a detection and ranging device fault based on a comparison between analyzing results of the image data and the detection and ranging data comprises comparing a known size of the object with a detection-and-ranging-captured size of the object.

15. The method of claim 14, further comprising querying, by the computer system, a size database to determine the known size of the object.

16. The method of claim 15, further comprising querying, by the computer system, the size database to determine the known size of at least one of: a vehicle length, a vehicle width, a vehicle height, or a license plate.

17. The method of claim 11, wherein the vehicle detection and ranging device comprises a Lidar device.

18. The method of claim 11, wherein the vehicle detection and ranging device comprises a Radar device.

19. The method of claim 11, further comprising augmenting detection and ranging data received from the fault detection and ranging device with image data from the vehicle camera.

20. A computer implemented method for a vehicle, the method being implemented on a computer system having one or more physical processors programmed with computer program instructions to perform the method, the method comprising:

receiving, via the computer system, detection and ranging data of an object from a vehicle detection and ranging device;

receiving, via the computer system, image data of the object from a vehicle camera;

analyzing, via the computer system, the detection and ranging data received from the vehicle detection and ranging device, to determine a detection-and-ranging-computed distance between the vehicle and the object;

analyzing, via the computer system, the image data received from the vehicle camera, to determine an image-computed distance between the vehicle and the object; comparing, via the computer system, the detection-and-ranging-computed distance with the image-computed distance; and determining, via the computer system, a detection and ranging device fault if the difference between detection-and-ranging-computed distance and the image-computed distance is above a threshold.

* * * * *